US010162557B2

(12) United States Patent
Walker

(10) Patent No.: US 10,162,557 B2
(45) Date of Patent: *Dec. 25, 2018

(54) METHODS OF ACCESSING MEMORY CELLS, METHODS OF DISTRIBUTING MEMORY REQUESTS, SYSTEMS, AND MEMORY CONTROLLERS

(71) Applicant: Micron Technology, Inc., Boise, ID (US)

(72) Inventor: Robert Walker, Raleigh, NC (US)

(73) Assignee: Micron Technology, Inc., Boise, ID (US)

(*) Notice: Subject to any disclaimer, the term of this patent is extended or adjusted under 35 U.S.C. 154(b) by 0 days.

This patent is subject to a terminal disclaimer.

(21) Appl. No.: 15/918,178

(22) Filed: Mar. 12, 2018

(65) Prior Publication Data

US 2018/0300079 A1 Oct. 18, 2018

Related U.S. Application Data

(60) Continuation of application No. 14/542,750, filed on Nov. 17, 2014, now Pat. No. 9,933,972, which is a
(Continued)

(51) Int. Cl.
*G06F 12/00* (2006.01)
*G06F 3/06* (2006.01)
*G06F 12/06* (2006.01)

(52) U.S. Cl.
CPC .......... *G06F 3/0644* (2013.01); *G06F 3/0604* (2013.01); *G06F 3/0683* (2013.01);
(Continued)

(58) Field of Classification Search
CPC ................ G06F 3/0644; G06F 12/06
(Continued)

(56) References Cited

U.S. PATENT DOCUMENTS 5,465,332 A * 11/1995 Deloye ................... G06F 13/28
710/22
6,125,421 A 9/2000 Roy
(Continued)

FOREIGN PATENT DOCUMENTS

CN 101438230 A 5/2009
CN 101483061 A 7/2009
(Continued)

OTHER PUBLICATIONS

"Korean Application Serial No. 10-2013-7025982, Notice of Preliminary Rejection dated Jul. 20, 2018", W/English Translation, 8 pgs.
(Continued)

*Primary Examiner* — Jae U Yu
(74) *Attorney, Agent, or Firm* — Schwegman Lundberg & Woessner, P.A.

(57) ABSTRACT

Methods of accessing memory cells, methods of distributing memory requests, systems, and memory controllers are described. In one such method, where memory cells are divided into at least a first region of memory cells and a second region of memory cells, memory cells in the first region are accessed according to a first address definition and memory cells in the second region are accessed according to a second address definition that is different from the first address definition. Additional embodiments are described.

12 Claims, 8 Drawing Sheets

Related U.S. Application Data division of application No. 13/042,164, filed on Mar. 7, 2011, now Pat. No. 8,892,844.

(52) U.S. Cl.
CPC .......... *G06F 12/06* (2013.01); *G06F 12/0653* (2013.01); *Y02D 10/13* (2018.01)

(58) Field of Classification Search
USPC ........................................................ 711/173
See application file for complete search history.

(56) References Cited

U.S. PATENT DOCUMENTS

| | | |
|---|---|---|
| 6,470,409 B1 | 10/2002 | Ridgeway |
| 6,816,165 B1 | 11/2004 | Radke |
| 7,765,366 B2 | 7/2010 | Akiyama et al. |
| 7,779,215 B2 | 8/2010 | Liou et al. |
| 7,797,319 B2 | 9/2010 | Pledmonte et al. |
| 8,018,752 B2 | 9/2011 | Jeddeloh |
| 8,892,844 B2 | 11/2014 | Walker |
| 9,933,972 B2 | 4/2018 | Walker |
| 2001/0039605 A1 | 11/2001 | Uematsu |
| 2006/0129767 A1 | 6/2006 | Berenyi et al. |
| 2006/0233367 A1 | 10/2006 | Birrell et al. |
| 2006/0294325 A1 | 12/2006 | Akiyama et al. |
| 2008/0320476 A1 | 12/2008 | Wingard et al. |
| 2010/0115228 A1 | 5/2010 | Parker et al. |
| 2012/0233413 A1 | 9/2012 | Walker |
| 2015/0074370 A1 | 3/2015 | Walker |

FOREIGN PATENT DOCUMENTS

| | | |
|---|---|---|
| CN | 103493026 A | 1/2014 |
| EP | 0777233 A1 | 6/1997 |
| JP | 9259041 A | 10/1997 |
| JP | 10232819 A | 9/1998 |
| JP | 2005100418 A | 4/2005 |
| KR | 1020080014066 A | 2/2008 |
| KR | 1020090130755 A | 12/2009 |
| TW | 201027541 A | 7/2010 |
| WO | WO-2004029816 A2 | 4/2004 |
| WO | WO-2012122182 A2 | 9/2012 |
| WO | WO-2012122182 A3 | 9/2012 |

OTHER PUBLICATIONS

"Chinese Application Serial No. 201280019658.6, Office Action dated Jun. 2, 2016", With English Translation, 7 pgs.

"Chinese Application Serial No. 201280019658.6, Office Action dated Jul. 29, 2015", 23 pgs.

"Chinese Application Serial No. 201280019658.6, Office Action dated Dec. 15, 2015", W/ English Translation, 7 pgs.

"Chinese Application Serial No. 201280019658.6, Response filed Feb. 25, 2016 to Office Action dated Dec. 15, 2015", (English Translation of Claims), 19 pgs.

"Chinese Application Serial No. 201280019658.6, Response filed Aug. 17, 2016 to Office Action dated Jun. 2, 2016", 22 pgs.

"European Application Serial No. 12755210.7 Response filed Jul. 16, 2015 to Extended European Search Report dated Apr. 10, 2015", With the amended claims, 38 pgs.

"European Application Serial No. 12755210.7, Extended European Search Report dated Apr. 10, 2015", 5 pgs.

"International Application Serial No. PCT/US2012/027905, International Preliminary Report on Patentability dated Oct. 2, 2013", 9 pgs.

"International Application Serial No. PCT/US2012/027905, Search Report dated Sep. 28, 2012", 3 pgs.

"International Application Serial No. PCT/US2012/027905, Written Opinion dated Sep. 28, 2012", 7 pgs.

"Taiwanese Application Serial No. 101107727, Response filed Mar. 10, 2016 to Office Action dated Dec. 7, 2015", 25 pgs.

"European Appiication Serial No. 18170452.9, Extended European Search Report dated Jul. 20, 2018", 8 pgs.

* cited by examiner

US 10,162,557 B2

METHODS OF ACCESSING MEMORY CELLS, METHODS OF DISTRIBUTING MEMORY REQUESTS, SYSTEMS, AND MEMORY CONTROLLERS

PRIORITY APPLICATION

This application is a continuation of U.S. application Ser. No. 14/542,750, filed Nov. 17, 2014, now issued as U.S. Pat. No. 9,933,972, which is a divisional of U.S. application Ser. No. 13/042,164, filed Mar. 7, 2011, all of which are incorporated herein by reference in their entirety.

BACKGROUND

Memory systems are used in many devices such as personal digital assistants (PDAs), laptop computers, mobile phones and digital cameras. Some of these memory systems include multiple memory devices that receive memory requests from a single bus.

BRIEF DESCRIPTION OF THE DRAWINGS

Some embodiments are illustrated by way of example and not limitation in the figures of the accompanying drawings in which.

DETAILED DESCRIPTION

Multi-channel memory systems have greater bandwidth and reduced power usage when compared to other systems. In some systems, each channel services a master or group of masters. This assignment allows for tighter quality of service control, but can reduce the bandwidth available from the memory system. When masters are dormant, the pins and bandwidth of the associated channels are idle and cannot be used by the rest of the system. The density of memory for each channel assigned to a master or group of masters may also be limited. For example, if a master only needs 128 kilobytes (KB) of memory, and the smallest available channel provides one gigabyte (GB) of memory, then a large portion of the channel will be unavailable because the entire channel is assigned to the master.

The inventor has discovered that the challenges noted above, as well as others, can be addressed by operating a memory system with multiple regions of memory cells in which each region has, for example, its own channel definition. Regional channel definitions enable the power usage and performance of the memory system to be configured (e.g., tuned).

In the following description, individual digits (e.g., binary digits, which are referred to hereinafter as "bits") are represented inside brackets. A single bit is represented as bit [G] where G is a non-negative integer from 0 upward. A group of consecutive bits is represented as bits [J:K] where J and K are non-negative integers. The consecutive bits in [J:K] begin with K and end with J. A byte has eight bits, and is represented by B[P] where P is a non-negative integer that identifies the byte.

Figure 1:
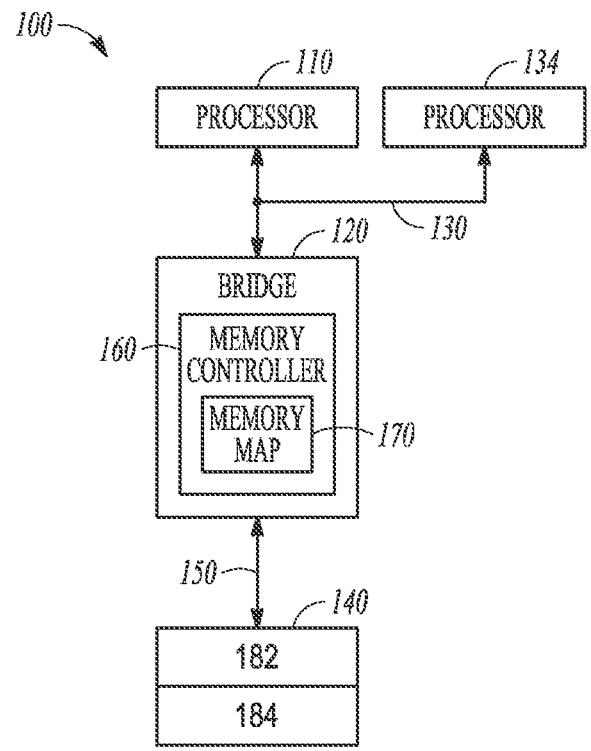
FIG. 1 is a block diagram of a system according to various embodiments of the invention.

FIG. 1 is a block diagram of a system 100 according to various embodiments of the invention. The system 100 includes a first processor 110 coupled to a bridge circuit 120 through a first bus 130. A second processor 134 is also coupled to the bridge circuit 120 through the first bus 130. The bridge circuit 120 is coupled to a memory system 140 through a second bus 150. The bridge circuit 120 executes memory requests from the processors 110 and 134 with a memory controller 160, and transfers data between the processors 110 and 134 and the memory system 140 over the first and second buses 130 and 150. Memory cells in the memory system 140 are located according to a memory map 170 in the memory controller 160. Memory cells in the memory system 140 may be divided (e.g., segmented) into multiple regions such as a first region 182 and a second region 184. The memory system 140 may include, for example, one or more dynamic random access memory (DRAM) devices, synchronous dynamic random access memory (SDRAM) devices and Flash memory devices. The processors 110 and 134 may be called masters, and there may be more than two masters in the system 100.

Figure 2:
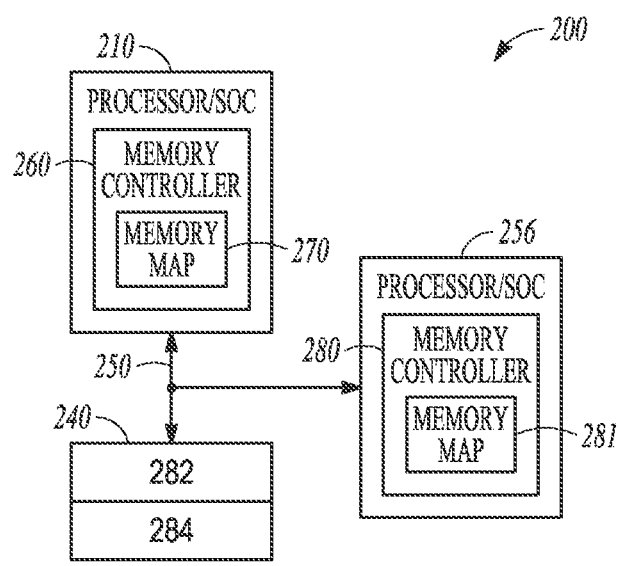
FIG. 2 is a block diagram of a system according to various embodiments of the invention.

FIG. 2 is a block diagram of a system 200 according to various embodiments of the invention. The system 200 includes a first processor, such as one included in a system-on-chip (SOC) 210, coupled to a memory system 240 through a bus 250. A second processor, such as one included in SOC 256, is also coupled to the memory system 240 through the bus 250. The SOCs 210 and 256 each include a processor and at least one other integrated circuit on a single integrated circuit chip that operate together as a system. The SOCs 210 and 256 may be called masters, and there may be more than two masters in the system 200. The SOC 210 executes memory requests with a memory controller 260 that transfers data to and from the memory system 240 over the bus 250. Memory cells in the memory system 240 are located according to a memory map 270 in the memory controller 260. The SOC 256 also includes a memory controller 280 and a memory map 282 to execute memory requests to the memory system 240. Memory cells in the memory system 240 may be divided into multiple regions such as a first region 282 and a second region 284. The memory system 240 may include, for example, one or more DRAM devices, SDRAM devices and Flash memory devices.

Figure 3:
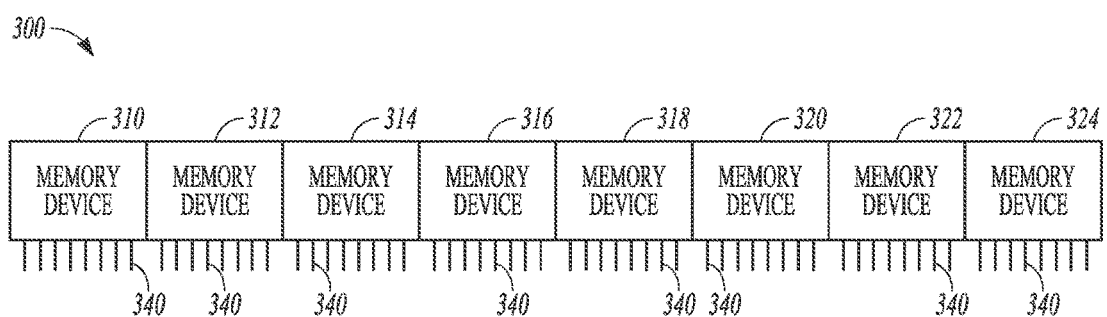
FIG. 3 is a block diagram of a memory system according to various embodiments of the invention.

Each memory system 140 and 240 shown in FIGS. 1 and 2 may be a single memory device or multiple memory devices arranged to exchange data (e.g., information)

through multiple pins coupled to a single bus such as the bus 150 or the bus 250. FIG. 3 is a block diagram of a memory system 300 according to various embodiments of the invention. The memory system 300 comprises eight memory devices 310, 312, 314, 316, 318, 320, 322 and 324 arranged in parallel. Each of the memory devices 310, 312, 314, 316, 318, 320, 322 and 324 is coupled to the same bus (not shown) in a system through eight data pins 340 to transfer data through the bus. The memory devices 310, 312, 314, 316, 318, 320, 322 and 324 may be, for example, DRAM devices, SDRAM devices, Flash memory devices or any combination thereof, and may be placed in a plan other than the parallel arrangement shown in FIG. 3. There may be more or fewer than eight data pins in each of the memory devices 310, 312, 314, 316, 318, 320, 322 and 324.

A memory map such as the memory maps 170 and 270 (see FIGS. 1 and 2) can be a structure of data that indicates how memory cells in the memory system 300 are oriented with respect to each other. A memory address received from a master is a collection of digits that may or may not correspond to (e.g., indicate or represent) the location of physical memory cells in the memory system 300. A memory map contains data to match the address from the master with one or more physical memory cells in the memory system 300.

A memory cell is accessed for read and write operations according to different classes of addresses, and each class of address has a definition. Addresses of a first class include a row address and a column address that, together, correspond to one memory cell at an intersection of a row and a column in an array of memory cells that has multiple rows and columns. The memory cells are divided into channels in multi-channel memory systems. A channel address is an address of a second class that identifies multiple memory cells in a channel in a multi-channel memory system. A bank address is an address of a third class that identifies a bank of multiple channels of memory cells. A system may have two or more banks of memory cells. The memory map discussed above also enables a division of the memory cells in a memory system into regions such as the regions 182, 184, 282 and 284 shown in FIG. 1 and FIG. 2. A region address is an address of a fourth class that identifies a region of memory cells in a multi-channel memory system as will be described herein below.

Figure 4:
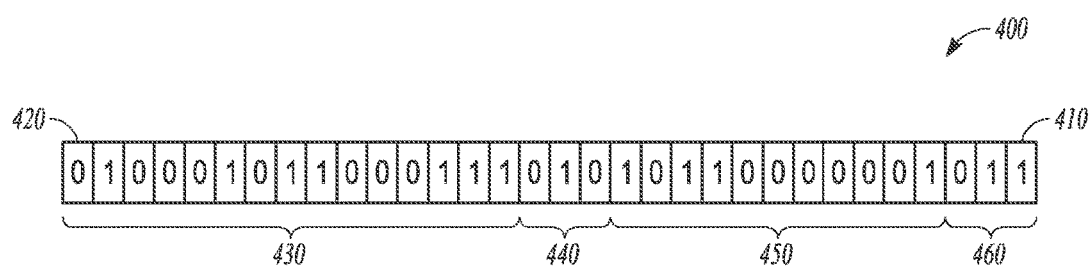
FIG. 4 is a block diagram of an address of a memory cell according to various embodiments of the invention.

FIG. 4 is a block diagram of an address 400 of a memory cell according to various embodiments of the invention. The address 400 is comprised of 32 bits [31:0], each bit having a value of "0" or "1," the combination of bits used to indicate where the memory cell is to be found. The bits of the address 400 are arranged consecutively from left to right. The address 400 has lower order bits toward the right, and the lowest order bit [0] is called a least significant bit (LSB) 410. The address 400 has higher order bits toward the left, and the highest order bit [31] is called a most significant bit (MSB) 420. A lower order bit in the address 400 is closer to the LSB 410, and a higher order bit is closer to the MSB 420. The address 400 includes row bits 430 [31:16] which are the highest order bits including the MSB 420. Next in the address 400 are bank bits 440 [15:13], column bits 450 [12:3] and channel bits 460 [2:0]. The channel bits 460 are the lowest order bits including the LSB 410. The address 400 may comprise 30, 40, 42 or any number of bits other than 32 bits according to various embodiments of the invention. Different orders of bits than what is shown may also be used, including a reverse order. The number and location of the row bits 430, the bank bits 440, the column bits 450 and the channel bits 460 in the address 400 are the definition of the address 400. The definition can be changed by changing the number or location of these bits. The definition of the address 400 has an impact on how and where data is stored in a memory system. Each region can have a different address definition.

The memory devices 310, 312, 314, 316, 318, 320, 322 and 324 of the memory system 300 may operate as a multi-channel system, and the channels can be uniquely defined for each region. Such definitions, called regional channel definitions, allow all of the data pins 340 to be used per region or just a small subset of the data pins 340. Regional channel definitions enable different regions in a memory system to be configured (e.g., tailored) based on the type of data that will be stored in the region. For example, a region of a memory system that is used for graphics can have a deep channel definition that will save power with a reduced number of activations for each memory request when compared to a region with shallow channels. A deep channel will access more data per access before moving to the next channel than a shallow channel. The number of activations is the number of rows of memory cells that are accessed during execution of a memory request. Graphic masters may be relatively insensitive to latency, and an extra few nanoseconds for a memory request to execute will not substantially affect performance.

Regional channel definitions are implemented according to various embodiments of the invention by the channel bits 460 in the address 400. The channel bits 460 may be located anywhere in the address 400, and may be contiguous or not contiguous with each other.

The regions may be implemented in at least two ways according to various embodiments of the invention. For example, bits of a region address may be added to the address 400 to indicate a region of memory cells such as the regions 182, 184, 282 and 284 shown in FIG. 1 and FIG. 2. The regions may also be defined by multiple programmable registers.

Figure 5:
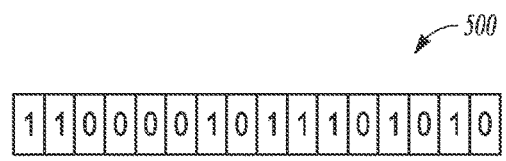
FIG. 5 is a block diagram of a programmable register according to various embodiments of the invention.

FIG. 5 is a block diagram of a programmable register 500 according to various embodiments of the invention. An address associated with (e.g., in) a memory request ("a memory request address") from a master may be compared to a value in the programmable register 500 to determine which region of memory has the memory cell corresponding to the address. The programmable register 500 includes sixteen bits to define a region, but more or fewer bits may be used. Each region of memory is defined by its own programmable register. The regions are not overlapping. The programmable register 500 may be re-programmed to change the definition of the regions during the life of a system.

Figure 6:
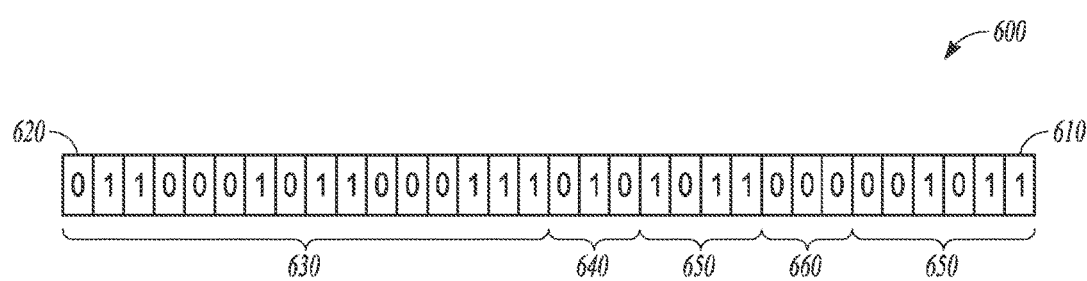
FIG. 6 is a block diagram of an address of a memory cell according to various embodiments of the invention.

Each region in a multi-channel memory system can have a different channel depth. The depth of a channel can be defined as the number of bytes that will be accessed from the channel before the address moves (e.g., rolls, increments, or crosses) into another channel. The depth of the channel can be determined by a prefetch of the memory device, and the location of the channel bits 460 in the address 400. A prefetch is the smallest number of bits that can be received in the multi-channel memory system if it receives more than one bit at a time. The prefetch is determined by the memory device. If the channel bits 460 are in the lowest order bits of the address 400 then the channel is shallow and a single memory request is more likely to span multiple channels. As the channel bits 460 shift up to higher order bits in the address 400, the channel becomes deeper. More bytes can be accessed from a deeper channel before crossing to the next channel. For example, with respect to the address 400 shown in FIG. 4, the three channel bits 460 [2:0] are the lowest order bits and define an 8 byte channel that is a shallow channel. FIG. 6 is a block diagram of an address 600 of a memory cell according to various embodiments of the invention. The address 600 is comprised of 32 bits [31:0] between a LSB 610 [0] and a MSB 620 [31]. The address 600 includes row bits 630 [31:16] which are the highest order bits and then bank bits 640 [15:13]. Ten column bits 650 are split into two groups [12:9] and [5:0], and three channel bits 660 [8:6] are located between the column bits 650 [12:9] and [5:0]. The column bits 650 are therefore not contiguous. When compared with the address 400 shown in FIG. 4, the channel bits 660 are of a higher order in the address 600 than the channel bits 460 in the address 400. The address 600 defines a 256 byte channel that is deeper than the 8 byte channel defined by the address 400.

Figure 7:
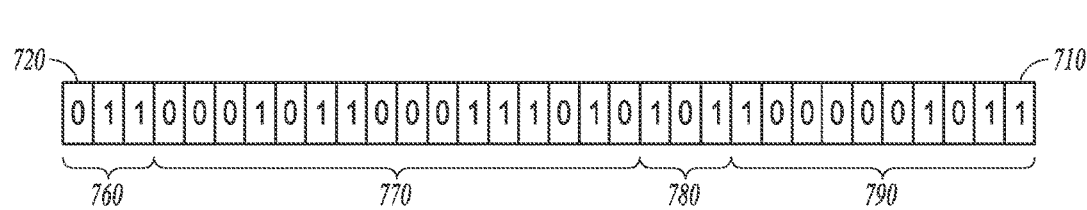
FIG. 7 is a block diagram of an address of a memory cell according to various embodiments of the invention.

FIG. 7 is a block diagram of an address 700 of a memory cell according to various embodiments of the invention. The address 700 is comprised of 32 bits [31:0] between a LSB 710 [0] and a MSB 720 [31]. The highest order bits in the address 700 are three channel bits 760 [31:29]. Following the channel bits 760, the address 700 includes row bits 770 [28:13], bank bits 780 [12:10] and column bits 790 [9:0] in order. The channel bits 760 define a channel that is deeper than a bank of memory cells because the channel bits 760 are higher than the bank bits 780. The address 700 represents a divided memory system.

The addresses 400, 600 and 700 each have multiple classes of address including a row address, a bank address, a column address and a channel address. The row address, the bank address and the column address have the same definition with respect to each other in all three addresses 400, 600 and 700. The definition of the channel address is different with respect to the other classes of address in each of the addresses 400, 600 and 700. The different definitions for the channel address result in a different depth of the channel for each of the addresses 400, 600 and 700.

Changing the depth of the channel means a memory controller will access more or fewer bytes within a single channel before the address increments into the next channel. This has an impact on how data is stored in a memory system as illustrated in FIGS. 8 and 9.

Figure 8:
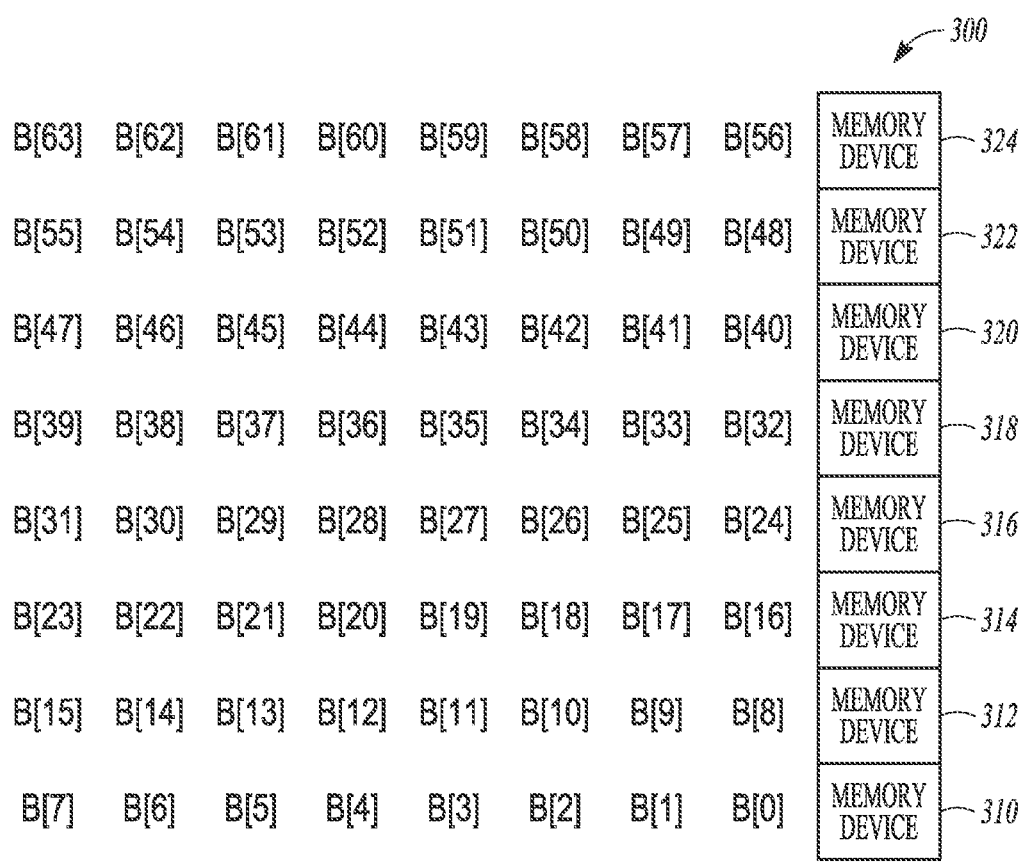
FIG. 8 is a schematic diagram illustrating data received by a memory system according to various embodiments of the invention.
Figure 9:
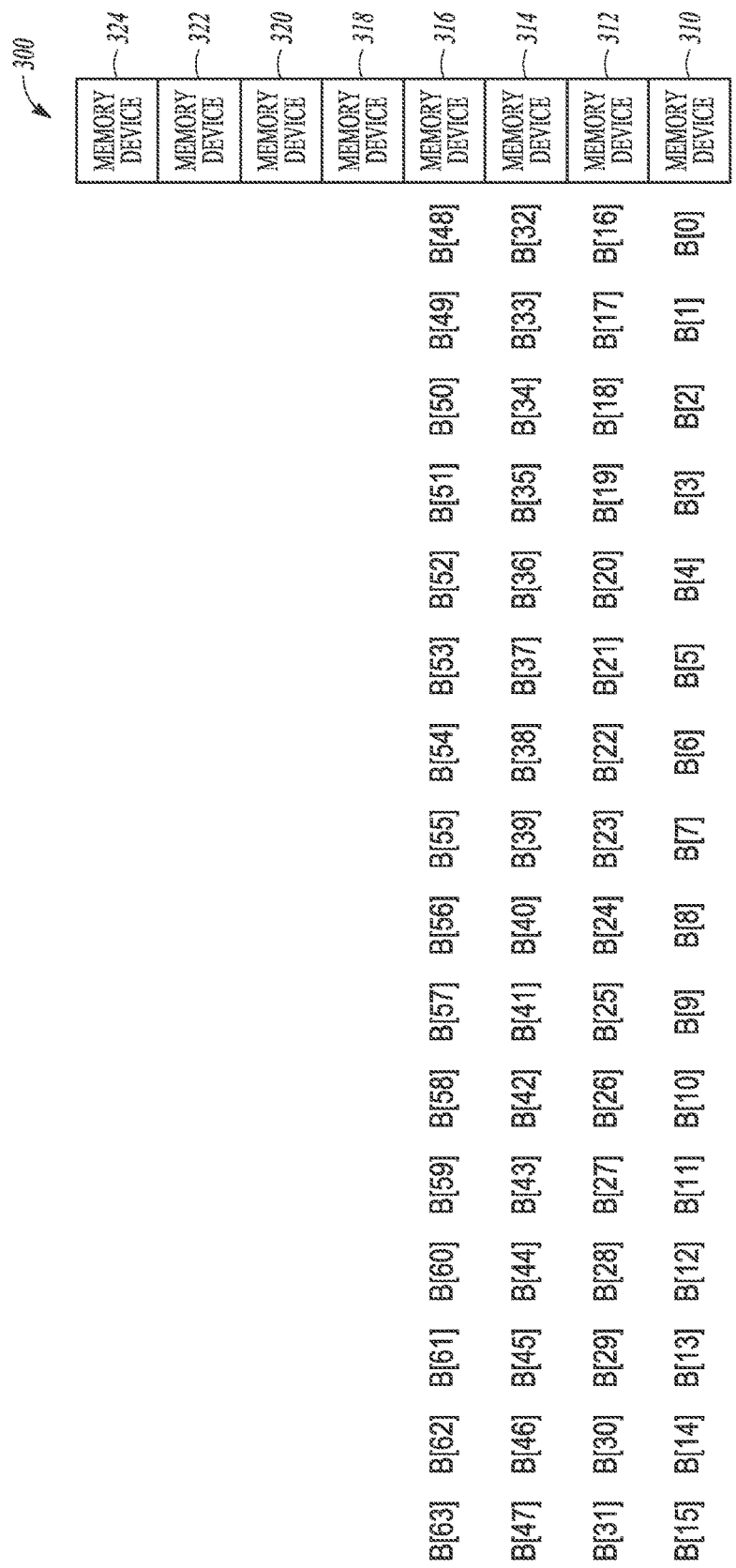
FIG. 9 is a schematic diagram illustrating data received by the memory system according to various embodiments of the invention.

FIG. 8 is a schematic diagram illustrating data received by the memory system 300 according to various embodiments of the invention. The memory system 300 is shown here to be receiving 64 bytes B[0] to B[63] addressed to shallow channels having a depth of 8 bytes with channel bits in the lowest order bits [n:0] of each address. The address 400 of FIG. 4 is an example of a shallow channel in which the three channel bits 460 [2:0] of the address 400 define an 8 byte channel. Each of the memory devices 310, 312, 314, 316, 318, 320, 322 and 324 has a pre-fetch of 8 bytes and receives bytes for a single channel during the execution of a memory request. The channel address increments every 8 bytes and the next channel in the next memory device will be accessed for each additional 8 bytes requested. The result is that 8 bytes B[0] to B[7] are written to the memory device 310, 8 bytes B[8] to B[15] are written to the memory device 312, and so on. Thus, 8 bytes are also written to each of the remaining memory devices 314, 316, 318, 320, 322 and 324. These accesses can occur in parallel or distributed in time across the channels.

Data is stored in the memory system differently when the channels are deeper. FIG. 9 is a schematic diagram illustrating data received by the memory system 300 according to various embodiments of the invention. In this case, the memory system 300 is shown to be receiving 64 bytes B[0] to B[63] addressed to channels having a depth of 16 bytes, deeper than the channels represented in FIG. 8. Addresses for the data shown in FIG. 9 have channel bits [n:1], one bit higher than the channel bits of FIG. 8. As in FIG. 8, each of the memory devices 310, 312, 314, 316, 318, 320, 322 and 324 has a pre-fetch of 8 bytes and receives bytes for a single channel during the execution of a memory request. Each of the memory devices 310, 312 and 314 receives 16 bytes. The memory devices 318, 320, 322 and 324 receive no data. The result is that 64 bytes B[0] to B[63] are written to the memory devices 310, 312, 314 and 316. Each channel can be accessed concurrently or at different times to complete the request.

Changing the depth of the channel has the most impact when the channel address bits are in lower order address bits in an address such as the address 400 shown in FIG. 4. The power usage and performance of a multi-channel memory system can be configured (e.g., scaled) by shifting the channel bits upwards. When a shallow channel is used, the number of memory devices accessed per memory request increases, potentially decreasing the access time for that memory request. However, the number of activations per memory request is higher for a shallow channel than it is for a deeper channel. For example, when the channel bits are assigned to bits [n:0] in the address 400 to create a shallow 8 byte channel as illustrated in FIG. 8, a 64 byte memory request will access all eight memory devices 310, 312, 314, 316, 318, 320, 322 and 324 using all of the bandwidth of the memory system 300.

When a deeper channel is used, the number of memory devices accessed per memory request decreases, potentially increasing the access time for that memory request. However, the number of activations per memory request is lower for a deeper channel than it is for a shallow channel. For example, if the channel bits are assigned to bits [n:1] in the address 400 to create a 16 byte channel as illustrated in FIG. 9, a 64 byte memory request will activate only four memory devices 310, 312, 314 and 316, using one-half the available bandwidth of the memory system 300. In another example, the channel bits are assigned to bits [n:2] in the address 400 to create a 32 byte channel. A 64 byte memory request will access two memory devices 310 and 312 using one-fourth of the available bandwidth of the memory system 300.

A channel depth for each region of a memory system is selected based on a desired balance between power usage and performance according to various embodiments of the invention. A channel depth for each region of the memory system 140 shown in FIG. 1 may be selected in the following manner. The first region 182 may serve, for example, a general processor that operates with a low latency response and a shallow channel depth. The shallow channel depth results in the use of all memory devices in a system to raise the bandwidth available per memory request. The first region 182 will supply more bandwidth for each memory request using more power than a region with deeper channels. The execution of a long memory request in shallow channels may result in the data looping around all of the channels more than once.

The second region 184 may have deeper channels to serve, for example, a graphics processor that is more tolerant of latency. The second region 184 will supply less bandwidth per memory request, but will perform the memory request using less power because fewer rows of memory cells are accessed. A graphics processor is particularly suited for graphics applications.

In another example, a memory system including thirteen memory devices may be operated in the following manner according to various embodiments of the invention. A channel X of the memory system is defined to include memory device 0 to memory device 7. Within the channel X, regions 0 through F are defined. Regions 0-3 are defined with a depth of 8 bytes. Regions 4-7 are defined with a depth of 32 bytes. Regions 8-F are defined with a depth of 64 bytes. A channel Y is defined to include memory device 8 to memory device 11. Within the channel Y, regions 0 through 4 are defined. Regions 0-1 are defined with a depth of 64 bytes and regions 2-3 are defined with a depth of 128 bytes. A channel Z is defined as the only remaining memory device 13. The channel Z comprises only one memory device and does not have regional channel depth mapping. The power usage of each region and channel can be configured (e.g., controlled) separately for both active and inactive periods and the performance can vary from one channel to another.

Figure 10:
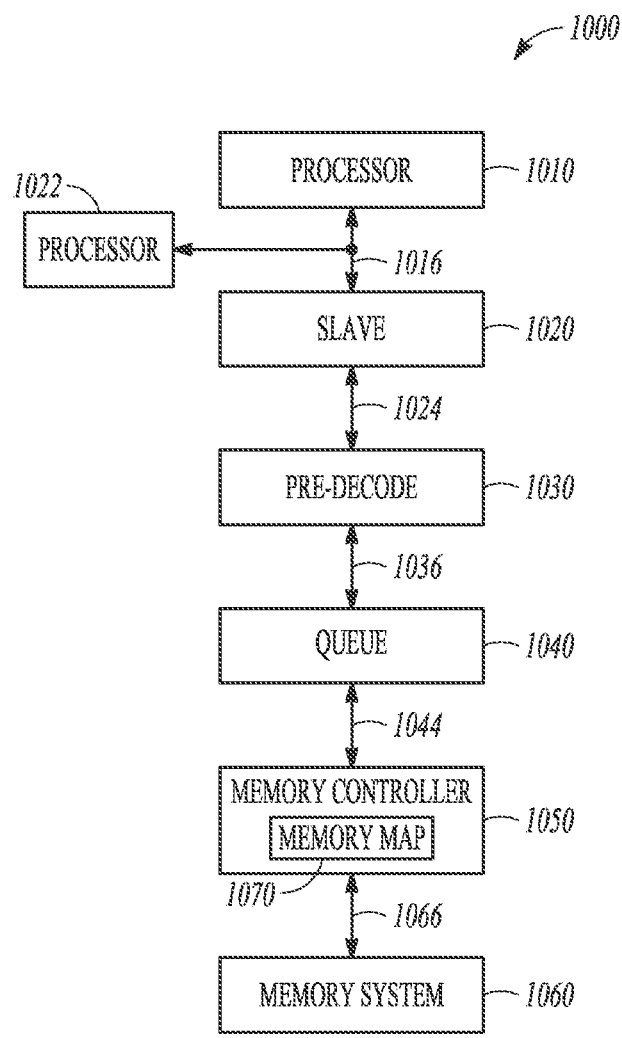
FIG. 10 is a block diagram of a system according to various embodiments of the invention.

FIG. 10 is a block diagram of a system 1000 according to various embodiments of the invention. A memory request is sent (e.g., transmitted) from a master such as a first processor 1010 over a first bus 1016 to a slave 1020. The system 1000 also includes a second processor 1022 that is coupled to the slave 1020 through the first bus 1016. The slave 1020 receives memory requests from multiple masters such as the processors 1010 and 1022 through the first bus 1016. The slave 1020 sends each memory request over a second bus 1024 to a pre-decode block 1030 that evaluates the memory request based on its size and address. The pre-decode block 1030 determines a region of the memory system 1060 to which the memory request is directed, and the depth of channels in the region. The pre-decode block 1030 rearranges the bits of the address in the memory request such that the memory request will be executed in the proper channels. The pre-decoder may compare the size of the memory request to the depth of the channels in the targeted region and generate sub-transactions. A sub-transaction can be the portion (e.g., "slice") of the initial request that will be written to or read from each channel. The pre-decode block 1030 then sends the memory request over a third bus 1036 to a queue 1040 where the memory request waits to be sent over a fourth bus 1044 to a memory controller 1050. The memory controller 1050 executes the memory request or sub-transaction in a memory system 1060 through a fifth bus 1066. The memory request or sub-transaction is executed according to a memory map 1070 in the memory controller 1050. The memory system 1060 may be the memory system 300 shown in FIG. 3 including the memory devices 310, 312, 314, 316, 318, 320, 322 and 324. The embodiments of the invention described herein are implemented by the pre-decode block 1030 and the memory controller 1050.

The memory controller 1050 may execute the memory request by issuing simultaneous commands to some or all of the channels in the memory system 1060. The memory controller 1050 may compare the size of the memory request to the depth of each channel and the number of channels to determine the number of bytes to be communicated using each channel. Commands may be broadcast to multiple channels in the memory system 1060 during the same cycle if each channel has the same number of memory sub-transactions, such that multiple channels receive the same command. If the number of memory sub-transactions differ for the channels then two different commands may be issued to execute the memory request. A memory sub-transaction executes less than the entire memory request. The commands are issued with multiple chip select (CS) signals such that the correct memory devices in the memory system 1060 receive and execute the commands. Each channel responds to the memory controller 1050 when it receives a command.

Figure 11:
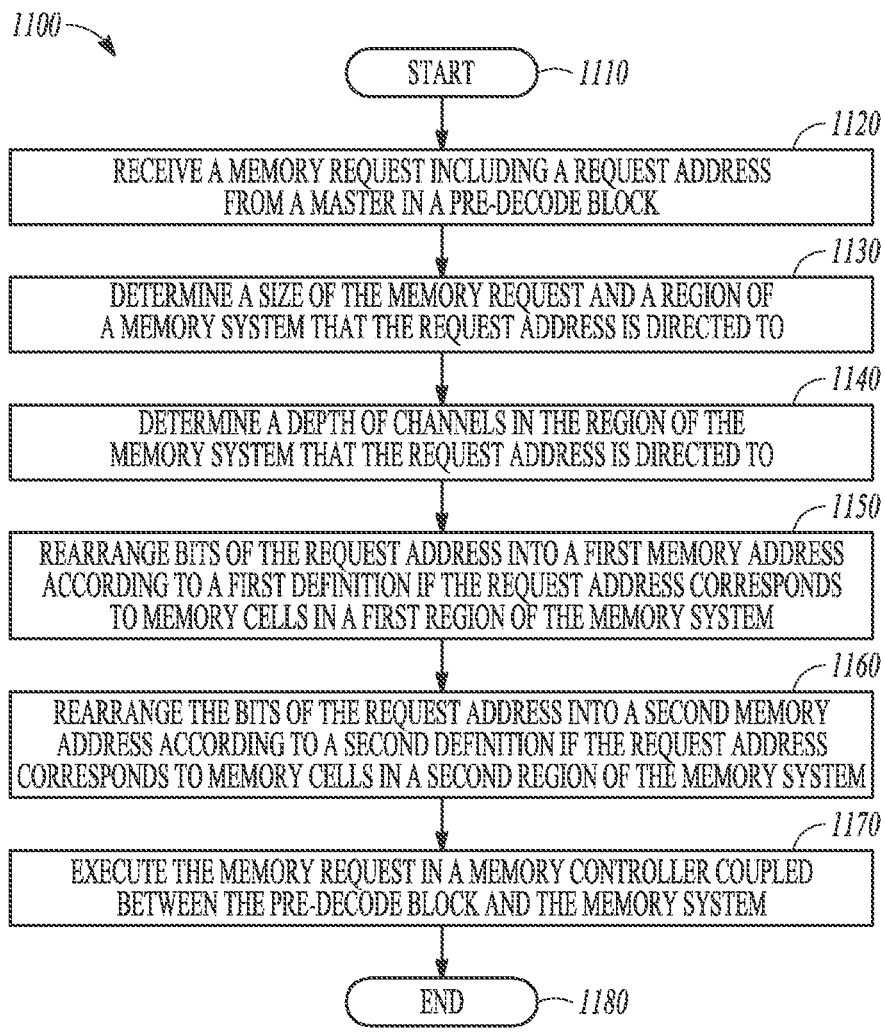
FIG. 11 is a flow diagram of one method according to various embodiments of the invention.

FIG. 11 is a flow diagram of one method 1100 according to various embodiments of the invention. In block 1110, the method 1100 starts. In block 1120, a memory request including a request address is received from a master in a pre-decode block. In block 1130, the size of the memory request and the region of a memory system that the request address is directed to are determined. In block 1140, the depth of channels in the region of the memory system that the request address is directed to is determined. In block 1150, bits of the request address are rearranged into a first memory address according to a first definition if the request address corresponds to memory cells in a first region of the memory system. In block 1160, the bits of the request address are rearranged into a second memory address according to a second definition if the request address corresponds to memory cells in a second region of the memory system. In block 1170, the memory request is executed in a memory controller coupled between the pre-decode block and the memory system. In block 1180, the method 1100 ends. Various embodiments may have more or fewer activities than those shown in FIG. 11. In some embodiments, the activities in FIG. 11 may be repeated, substituted for one another, and/or performed in serial or parallel fashion.

Figure 12:
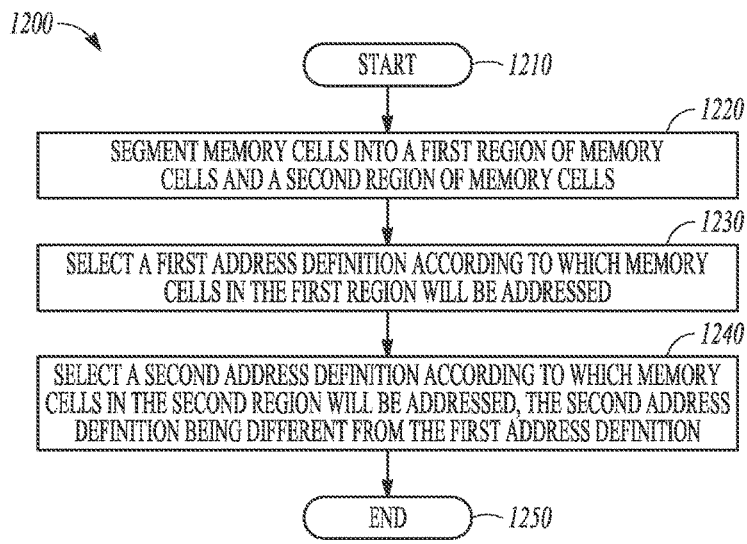
FIG. 12 is a flow diagram of one method according to various embodiments of the invention.

FIG. 12 is a flow diagram of one method 1200 according to various embodiments of the invention. In block 1210, the method 1200 starts. In block 1220, memory cells are divided into a first region of memory cells and a second region of memory cells. In block 1230, a first address definition is selected according to which memory cells in the first region will be addressed. In block 1240, a second address definition is selected according to which memory cells in the second region will be addressed, the second address definition being different from the first address definition. In block 1250, the method 1200 ends. Various embodiments may have more or fewer activities than those shown in FIG. 12. In some embodiments, the activities in FIGS. 11 and 12 may be repeated, substituted for one another, and/or performed in serial or parallel fashion.

Figure 13:
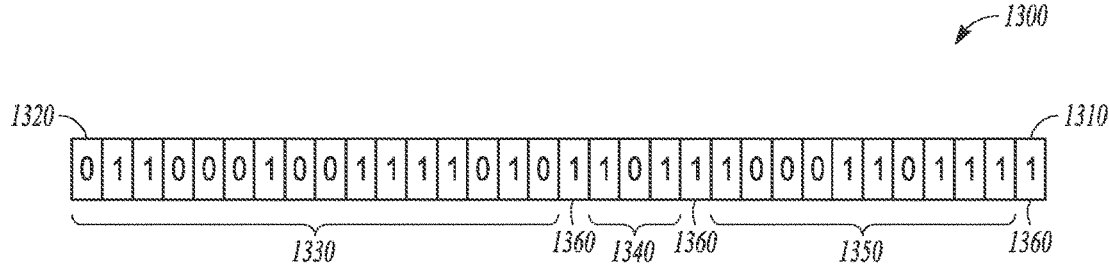
FIG. 13 is a block diagram of an address of a memory cell according to various embodiments of the invention.

FIG. 13 is a block diagram of an address 1300 of a memory cell according to various embodiments of the invention. The address 1300 is comprised of 32 bits [31:0] between a LSB 1310 [0] and a MSB 1320 [31]. The address 1300 includes row bits 1330 [31:16] which are the highest order bits including the MSB 1320. The address 1300 also includes bank bits 1340 [14:12], column bits 1350 [10:1] and three channel bits 1360 [15], [11] and [0]. The row bits 1330, the bank bits 1340 and the column bits 1350 are separated from each other by a single channel bit 1360. The channel bits 1360 are distributed through the address 1300 and are not contiguous with each other.

Memory systems that respond quickly and efficiently to memory requests are useful. Such systems may result by implementing various embodiments described herein, which may operate to include dividing a memory system into regions and accessing each region in a different manner, such as to allow the memory system to have some regions that operate with less power and other regions that respond to memory requests with low latency without using dedicated channels. The regions may be defined according to the type of data that will be stored therein. The relationship between power usage and latency can be varied across a single memory system. The size of each region is flexible and is not necessarily determined by the physical arrangement of the memory devices in the memory system.

Memory systems and methods described herein according to various embodiments of the invention enable a varied granularity of memory cell groupings across different regions of a memory system. Neighboring regions of memory cells may have channels with different characteristics that are not based on the size of physical memory devices but rather on a desirable balance between power usage and performance. A memory request can be processed in a single channel or multiple channels to achieve the desired balance. Patterns of access to the memory system may thus depend on a configuration of the channels and a size of memory requests. A smaller memory request can be accomplished with fewer channels of memory cells to save power. Each memory request may be distributed across channels of memory cells based on the size of the memory request and a definition of the channels. For example, 32 bits may be accessed in one of four 64 bit channels in a region having 256 bits in total rather than accessing all 256 bits at once. Thus, memory requests can be implemented to avoid reserving excessive numbers of memory cells. The proposed system can configure the access of memory cells based on the size of each request.

Example structures and methods of managing a memory system have been described. Although specific embodiments have been described, it will be evident that various modifications and changes may be made to these embodiments. For example, the memory system may include a single memory device with multiple channels or multiple memory devices each having one or more channels. Accordingly, the specification and drawings are to be regarded in an illustrative rather than a restrictive sense.

The Abstract of the Disclosure is provided to comply with 37 C.F.R. § 1.72(b), requiring an abstract that allows the reader to quickly ascertain the nature of the technical disclosure. It is submitted with the understanding that it will not be used to interpret or limit the claims. In addition, in the foregoing Detailed Description, it may be seen that various features are grouped together in a single embodiment for the purpose of streamlining the disclosure. This method of disclosure is not to be interpreted as limiting the claims. Thus, the following claims are hereby incorporated into the Detailed Description, with each claim standing on its own as a separate embodiment.

What is claimed is:

1. A method, comprising:
   accessing data in a first region of memory cells of a memory system, wherein the memory cells of the memory system are divided into channels, each channel comprising multiple memory cells, and wherein the data is accessed in accordance with a first address definition including one or more bits identifying a first channel depth to be accessed, wherein the channel depth is a number of bytes accessed in the channel before going to another channel; and
   accessing data in a second region of memory cells of the memory system, wherein the data in the second region is accessed in accordance with a second address definition including one or more bits identifying a second channel depth to be accessed, wherein the first and second channel depths are different from one another; and
   wherein the channel depth bits are located in a different positions in the second address definition than in the first address definition.

2. The method of claim 1, wherein accessing data in the second region of memory cells further comprises accessing the data in the second region of memory cells with less power than is used to access data in the first region of memory cells.

3. The method of claim 2, wherein the channel depth in the second region of memory cells is deeper than the channel depth in the first region of memory cells.

4. The method of claim 3, wherein the channel depth bits of the first address definition are of a lower order than the channel depth bits of the second address definition.

5. The method of claim 1, wherein the first and second address definitions each include multiple bits defining a respective row address and column address in addition to the channel depth.

6. The method of claim 5, wherein each of the first and second address definitions further includes a respective region address.

7. The method of claim 1, wherein accessing data in the second region of memory cells further comprises accessing the data in the first region of memory cells with a greater latency than is used to access data in the second region of memory cells.

8. The method of claim 7, wherein the channel depth in the first region of memory cells is shallower than the channel depth in the second region of memory cells.

9. A method comprising:
   receiving first and second data at a memory system in respective first and second memory commands from respective first and second masters;
   writing the first data to the first region of memory cells of a memory system through use of a first address definition when the master is of a first type, the first region having a first channel depth, and the address definition including one or more channel depth bits in a first position in the first address definition; and
   writing the second data to the second region of memory cells of the memory system through use of a second address definition when the master is of a second type, the second region having a second channel depth different from the first channel depth, wherein the first address definition is different than the second address definition.

10. The method of claim 9, wherein the first data is written to the first region when the first master is more tolerant of latency than the second master.

11. The method of claim 9, wherein:
   the first data is written to the first region when the first master comprises a general processor; and
   the second data is written to the second region when the second master comprises a graphics processor.

12. The method of claim 11, wherein the second channel depth of the second region is deeper than the first channel depth.

* * * * *